(12) United States Patent
Lee

(10) Patent No.: US 7,756,868 B2
(45) Date of Patent: Jul. 13, 2010

(54) METHOD FOR PROVIDING SEARCH RESULTS LIST BASED ON IMPORTANCE INFORMATION AND SYSTEM THEREOF

(75) Inventor: Jae Gwang Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 992 days.

(21) Appl. No.: 10/598,386

(22) PCT Filed: Feb. 25, 2005

(86) PCT No.: PCT/KR2005/000524

§ 371 (c)(1), (2), (4) Date: Aug. 25, 2006

(87) PCT Pub. No.: WO2005/083593

PCT Pub. Date: Sep. 9, 2005

(65) Prior Publication Data

US 2009/0043732 A1 Feb. 12, 2009

(30) Foreign Application Priority Data

Feb. 26, 2004 (KR) .................... 10-2004-0012859

(51) Int. Cl.
*G06F 17/30* (2006.01)
(52) U.S. Cl. ...................... 707/725; 707/728
(58) Field of Classification Search .............. 707/3, 707/6, 7, 101, 104.1
See application file for complete search history.

(56) References Cited

U.S. PATENT DOCUMENTS

| 5,515,490 | A * | 5/1996 | Buchanan et al. | ............ 715/209 |
|---|---|---|---|---|
| 6,233,573 | B1 * | 5/2001 | Bair et al. | ................. 707/3 |
| 7,346,628 | B2 * | 3/2008 | Porter | ................. 707/104.1 |
| 7,490,092 | B2 * | 2/2009 | Sibley et al. | ................. 707/100 |
| 7,565,363 | B2 * | 7/2009 | Anwar | ................. 707/101 |
| 2002/0069312 | A1 * | 6/2002 | Jones | ................. 711/100 |
| 2004/0139116 | A1 * | 7/2004 | Porter | ................. 707/104.1 |
| 2008/0140629 | A1 * | 6/2008 | Porter | ................. 707/3 |
| 2009/0125534 | A1 * | 5/2009 | Morton et al. | ................. 707/100 |

FOREIGN PATENT DOCUMENTS

| JP | H08-161348 | 6/1996 |
|---|---|---|
| JP | H11-296522 | 10/1999 |
| JP | 2001-175675 | 6/2001 |
| JP | 2001-209655 | 8/2001 |
| JP | 2002-132769 | 5/2002 |
| JP | 2003-050795 | 2/2003 |

(Continued)

*Primary Examiner*—Leslie Wong
(74) *Attorney, Agent, or Firm*—H.C. Park & Associates, PLC

(57) ABSTRACT

The present invention relates to a method for providing a search result list by a search engine and a system thereof, and more particularly, to a method for generating a search result list by reflecting importance information in processing the search result list corresponding to a predetermined keyword input from a user terminal by a search engine and a system thereof. According to the present invention, there is an effect that is possible to provide method and system for providing a search result list, capable of providing a search result list on the basis of importance information in which accuracy and information on the registration date of a corresponding content are reflected.

19 Claims, 13 Drawing Sheets

FOREIGN PATENT DOCUMENTS

| | | |
|---|---|---|
| JP | 2003-157273 | 5/2003 |
| KR | 10-1997-0076328 A | 12/1997 |
| KR | 10-1999-0013736 A | 2/1999 |
| KR | 10-2001-0304335 A | 11/2001 |
| KR | 10-2004-0017008 A | 2/2004 |

* cited by examiner

FIG. 1

| NEWS ▽ | Patent | | | search | |
|---|---|---|---|---|---|
| Web search | directory | ...... | news | cafe | blog | news: <u>news</u> | photo news | video news period: ◯ all     ◯ latest month     ◯ latest week
   scope: ◯ all     ◯ news title     ╱―110

HOT news   Sorting method ⌐in order of date ▽ | in order of registration time ▽¬ (1-20 / 360)

<u>Sinhan Bank, starting "Cash Flow loan"</u>   Money today [Business] 2004.02.21 (Sat.) a.m. 9:14

| NEWS ▽ | Patent | | | search | |
|---|---|---|---|---|---|
| Web search | directory | ...... | news | cafe | blog | news: <u>news</u> | photo news | video news period: ◯ all     ◯ latest month     ◯ latest week
   scope: ◯ all     ◯ news title     ╱―120

HOT news   Sorting method ⌐in order of date ▽ | In order of accuracy ▽¬ (1-20 / 360)

<u>Sinhan Bank, starting "Cash Flow loan"</u>   Money today [Business] 2004.02.21 (Sat.) a.m. 9:14

Time function table

| Time difference information | Time function value |
|---|---|
| 3 Hours | 0.98 |
| 6 Hours | 0.94 |
| 9 Hours | 0.85 |
| ...... | ...... |
| 2 Days 9 Hours | 0.33 |
| ...... | ...... |

FIG. 14

Temporal adverb keyword database

| Temporal adverbs | Time difference information | Weight |
|---|---|---|
| Today | 1 Day | 0.99 |
| | ...... | ...... |
| | 7 Days | 0.33 |
| Tomorrow | 1 Day | 0.97 |
| | ...... | ...... |
| | 7 Days | 0.38 |
| Lately | ...... | ...... |
| | 7 Days | 0.85 |
| | ...... | ...... |
| | 1 Month | 0.55 |

FIG. 17

| NEWS ▽ | Patent | search |

| Web search | directory | ....... | news | cafe | blog | news: news | photo news | video news period: ○ all    ○ latest month  ○ latest week
scope:  ○ all    ○ news title
                                    ╱— 1710              ╱— 1720
HOT news  1730
          Sorting method ⌐ in order of importance ▽ | in order of date ▽ | in order of accuracy ▽ ⌐
          (1-20 / 360)

Sinhan Bank, starting "Cash Flow loan"  Money today [Business] 2004.02.21 (Sat.) a.m. 9:14
importance 98%

METHOD FOR PROVIDING SEARCH RESULTS LIST BASED ON IMPORTANCE INFORMATION AND SYSTEM THEREOF

CROSS REFERENCE TO RELATED APPLICATIONS

This application claims the benefit of PCT Application No. PCT/KR2005/000524 filed Feb. 25, 2005, the disclosure of which is incorporated herein by reference.

TECHNICAL FIELD

The present invention relates to a method for providing a search result list by a search engine and a system thereof, and more particularly, to a method for generating a search result list by reflecting importance information in processing the search result list corresponding to a predetermined keyword input from a user terminal by a search engine and a system thereof.

BACKGROUND ART

As known to those skilled in the related art, a keyword search method is the most general search service method performed in a system providing a search result list. In case that a keyword is input from a user, the search result providing system for providing keyword search services like above provides a user terminal with search results (e.g., a web site including the keyword, an article including the keyword, an image with a file name including the keyword, etc) including the keyword.

According to conventional method and system for providing a search result list like above, generally, in providing a search result list with respect to a particular keyword input from a user terminal, at least one content is sorted in order of a registration date or accuracy computed on the basis of a predetermined accuracy computing algorithm. FIGS. 1 and 2 illustrate one example for a search result list processed by the conventional method of providing a search result list like above.

Referring to FIG. 1, in general methods providing a search result list, there is illustrated a method for providing at least one searched content "in order of registration time" after searching for contents including a predetermined keyword.

In addition, in general methods providing a search result list, FIG. 2 illustrates a method for providing at least one searched content "in order of accuracy" after searching for contents including a predetermined keyword. In the prior art, methods providing at least one content "in order of accuracy" like above adopt the following method. First, it is searched how many input keyword queries are included in a corresponding content. Through the search like above, frequency that the keyword appears in the content, a location where the keyword appears within the content, structure of a relevant content document, and the like are transformed into numeric values. At this time, it is performed on the basis of the length of the content, a link depth, a degree of link, a degree of being linked, popularity, information on components of the content (whether the content is an adult content or a spam content), and the like. In addition, input of recommendation data by a corresponding content provider may be reflected to compute accuracy, based on embodiment. For example, an editor recommendation content of a search engine operator may be embodied to increase exposure frequency with respect to the content in such a manner that an editor adjusts a numeric value of accuracy with respect to service items or recommendations of the company upon input of the content. The aforementioned information are individually analyzed to be transformed into numeric values in accordance with a predetermined algorithm and data transformed into numeric values are normalized to be defined as values between 0 and 1 (or between 0% to 100%). At this time, the defined values like above may be used as accuracy data.

The aforementioned methods providing a search result list may be arranged into two methods:

(1) after searching for contents by using keyword queries and computing accuracy, sorting at least one searched content on the basis of results of accuracy values; and (2) after searching for contents by using keyword queries and computing accuracy, sorting at least one content having results of accuracy values on the basis of information of a date registered to a content registration database (or input time information of the content).

According to method and system for providing a search result list in the prior art, in case of contents in which time is a very important component, such as news contents, or in case of knowledge search contents with opportuneness, there is a problem that it is difficult to find out accurate search results only with an accuracy-based sort or a registration date based sort. As for one example, in case that a user searches for the aforementioned opportune contents by using a keyword 'patent', according to the conventional method providing a search result list, a search result list may be read only in order of accuracy or in order of the registration date. Thus, the user has to read the search result list in which accuracy with respect to the keyword 'patent' is high, however, search results are not sorted in order of the registration date. Otherwise, the user has to read the search result list in which searched results with respect to the keyword 'patent' are sorted in order of registration date, however, not sorted in order of accuracy. Therefore, there is a disadvantage that the user may have to search for several pages of the search result list to find out wanted contents.

As for another example, in case that a user wants to use web contents (web page contents, news contents, knowledge search contents, etc) with respect to what 'the latest popular movies' are, according to the conventional method providing a search result list, a search result list may be sorted in order of accuracy without reflecting a concept of time on popular movies and then provided for the user. Otherwise, the search result list may be sorted in order of the registration date without reflecting a concept of accuracy on popular movies and then provided for the user. Thus, there is a problem that it is difficult for the user to be provided with wanted search results. Accordingly, problems like above have caused lots of inconveniences and discontents to users who want to search for a more accurate search result list a little faster.

Furthermore, in case of mobile search services using personal portable terminals which are recently widely used, users have to read a search result list for a long time to find out wanted contents. Thus, there is a problem that unnecessary communication costs increase.

Because of the aforementioned problems, in a method for providing a search result list, in service now, there is required a more advanced method for providing a search result list, enabling users to search for wanted information in an initial search result list.

DISCLOSURE OF THE INVENTION

Technical Questions

The present invention is conceived to solve the aforementioned problems in the prior art. Thus, an object of the present invention is to provide method and system for providing a search result list, capable of providing a search result list on the basis of importance information in which accuracy and information on the registration date of a corresponding content are reflected.

Furthermore, in case that opportuneness is required, an object of the present invention is to provide a user with a search result list having both opportuneness and accuracy, by using accuracy of a corresponding content and information on the registration date thereof.

Furthermore, an object of the present invention is to improve accuracy of a search result list in a user's position by providing the user with the search result list based on importance information.

Furthermore, in case that a temporal adverb is included in a corresponding content, an object of the present invention, is to provide a user with a search result list in which the latest information is reflected by analyzing the temporal adverb and lowering order of importance of a content which is out of a predetermined period based on a present time.

Furthermore, in mobile search services using personal portable terminals, an object of the present invention is to reduce communication costs spent in using the mobile search services by providing a search result list in which accuracy and the latest information with respect to a predetermined keyword query wanted by a user are reflected.

Technical Solutions

A method for providing a user with a predetermined search result list by a search engine in accordance with a first embodiment of the present invention, the method comprises the steps of: maintaining a content information database storing at least one content and information on a registration date of the content; maintaining a timer maintaining time information and a time function table storing a predetermined time function having time difference information as a variable, wherein the time difference information is difference between information on the registration date of the content and the time information; receiving a keyword from a terminal of the user; searching for at least one content including the keyword by referring to the content information database; computing accuracy of the searched content with respect to the keyword, based on a predetermined accuracy computing criterion; searching for information on the registration date of the searched content by referring to the content information database; computing time difference information by using information on the searched registration date and the time information received from the timer; computing a time function value corresponding to the computed time difference information by referring to the time function table; computing importance information of the searched content by calculating the computed accuracy and the computed time function value; and sorting at least one content in accordance with the computed importance information, thereby processing the sorted content into search result list information.

Furthermore, a method for providing a user with a predetermined search result list by a search engine in accordance with a second embodiment of the present invention, the method comprises the steps of: maintaining a content information database storing at least one content and information on a registration date of the content; maintaining a temporal adverb keyword database storing at least one predetermined temporal adverb keyword and predetermined weight corresponding thereto; maintaining a timer maintaining time information; receiving a keyword from a terminal of the user; searching for at least one content including the keyword by referring to the content information database; computing accuracy of the searched content with respect to the keyword, based on a predetermined accuracy computing criterion; searching for information on the registration date of the searched content by referring to the content information database; computing time difference information by using information on the searched registration date and the time information received from the timer; abstracting the temporal adverb keyword stored in the temporal adverb keyword database, from the searched content; and in case that the temporal adverb keyword is abstracted from the content, abstracting the weight corresponding to the abstracted temporal adverb keyword and the computed time difference information, by referring to the temporal adverb keyword database; computing importance information by calculating the computed accuracy and the abstracted weight; and sorting at least one content in accordance with the computed importance information, thereby processing the sorted content into search result list information.

Furthermore, a system for providing a user with a predetermined search result list by a search engine in accordance with one preferred embodiment of the present invention, the system comprises: a content information database storing at least one content and information on a registration date of the content; a timer maintaining time information; a time function table storing a predetermined time function having time difference information as a variable, wherein the time difference information is difference between information on the registration date of the content and the time information; an interface unit receiving a keyword from a terminal of the user and in response thereto, transmitting search result list information to the terminal; a database search unit searching for at least one content including the keyword and information on the registration date of the content, by referring to the content information database; an accuracy computing unit computing accuracy of the searched content with respect to the keyword, based on a predetermined accuracy computing criterion; an importance information computing unit computing time difference information by using information on the searched registration date and the time information received from the timer, computing a time function value corresponding to the computed time difference information by referring to the time function table, and computing importance information of the searched content by calculating the computed accuracy and the computed time function value; and a search result processing unit sorting at least one content in accordance with the computed importance information, thereby processing the sorted content into search result list information.

BRIEF DESCRIPTION OF THE DRAWINGS

FIGS. 1 and 2 are drawings illustrating one example of search result list information provided to a user terminal, in a system providing a search result list in accordance with the prior art.

FIG. 6 is a drawing illustrating one example of a time function table recording a time function value corresponding to time difference information, used in the first embodiment of the present invention.

FIG. 14 is a drawing illustrating one example of a temporal adverb keyword database recording weight corresponding to time difference information by predetermined temporal adverb keyword, used in the second embodiment of the present invention.

FIG. 17 is a drawing illustrating one example of search result list information provided to a user terminal as a result that the method providing a search result list in accordance with the present invention is performed.

BEST MODE FOR CARRYING OUT THE INVENTION

Hereinafter, method and system for providing a search result list by using importance information in accordance with one preferred embodiment of the present invention will be described with reference to the accompanying drawings.

Figure 3:
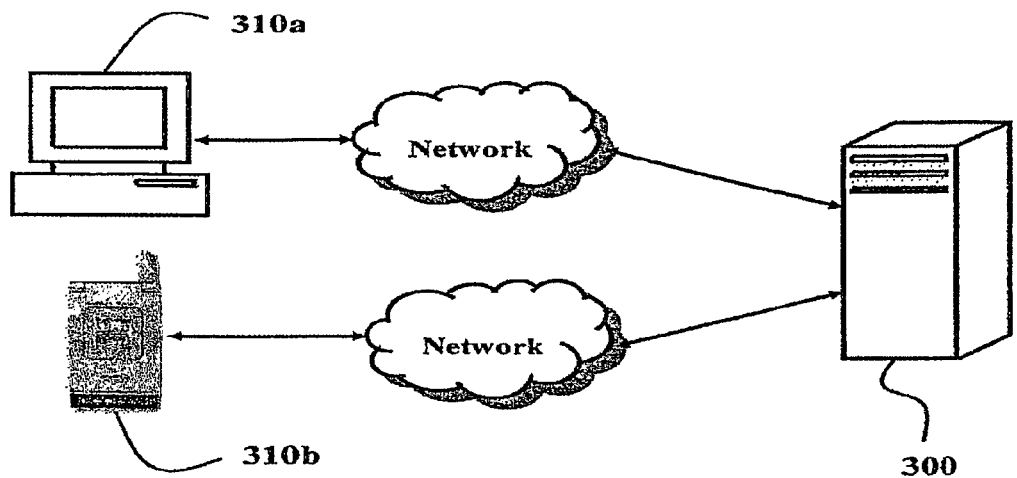
FIG. 3 is a drawing illustrating a network connection of a system providing a search result list in accordance with one embodiment of the present invention.

FIG. 3 is a drawing illustrating a network connection of a system providing a search result list in accordance with one embodiment of the present invention. Users access a system for providing a search result list 300 through a wired/wireless communication network by using a user terminal 310*a* or 310*b* and then input a keyword, wherein the user terminal 310*a* or 310*b* includes a personal computer or a personal portable terminal. The system for providing a search result list 300 transmits keyword search results corresponding to the input keyword to the user terminal 310*a* or 310*b*. In addition, the system for providing a search result list 300 according to the present embodiment sorts search results with respect to the input keyword, based on importance information, and further transmits the sorted search results to the user terminal 310*a* or 310*b*. The user terminal 310*b*, i.e. a personal portable terminal is a general concept for a terminal with computing capacity by mounting a predetermined communication module and microprocessor thereto, such as for example, a PDA (Personal Digital Assistant), a handheld PC, a cellular phone and the like.

Figure 4:
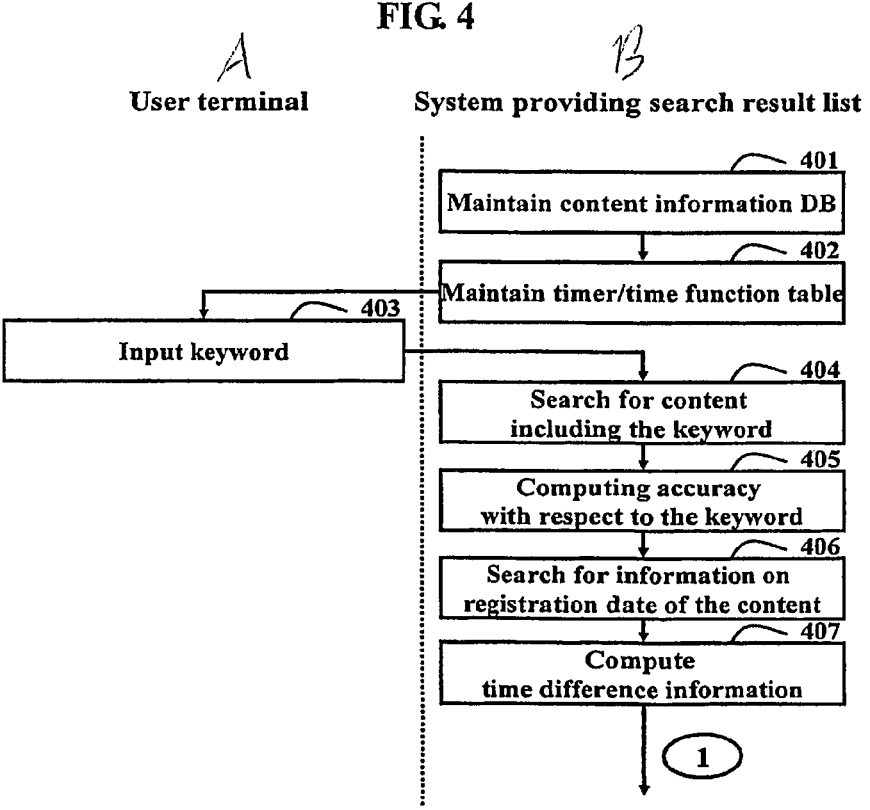
FIGS. 4 and 5 are flowcharts illustrating a method providing a search result list in accordance with a first embodiment of the present invention.
Figure 5:
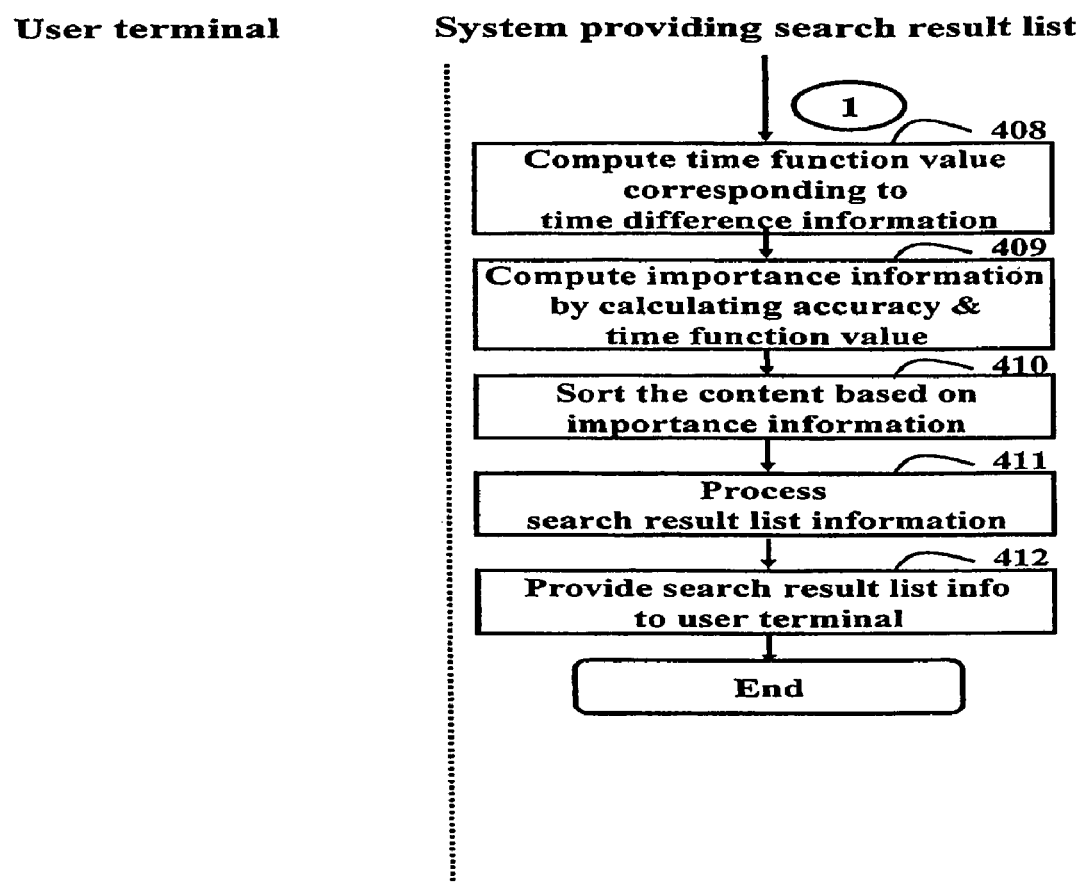

FIGS. 4 and 5 are flowcharts illustrating a method providing a search result list in accordance with a first embodiment of the present invention.

Referring to FIGS. 4 and 5, the method may comprise the following steps.

A system for providing a search result list according to the preset invention maintains a content information database storing at least one content and information on the registration date of the content (step 401). Information on the registration date of the content may be time information that predetermined web page data, news article data, or knowledge search data are received from a predetermined content provider and the like, or a system of the present invention. Moreover, information on the registration date of the content may be time information that corresponding data are registered to the content information database.

In addition, the system for providing a search result list according to the preset invention maintains a timer maintaining time information and a time function table storing a predetermined time function having time difference information as a variable (step 402). The time difference information recorded in the time function table may be difference between information on the registration date of the content and the time information maintained in the timer. The time information may be current time information as for one example. Moreover, any wanted time information may be received from a system operator or a search engine user and recorded in the timer.

FIG. 6 is a drawing illustrating one example of a time function table recording a time function value corresponding to time difference information, used in the first embodiment of the present invention. Referring to FIG. 6, the time function table according to one embodiment of the present invention records a time function value corresponding to predetermined time difference information. As for one example, in case that the time difference information is 3 hours, a time function value corresponding thereto may be 0.98. The time function value like above may have a decreasing value as the time difference information increases. This implies that a time function value of a corresponding content decreases as information on the registration date of the content goes away from current time information. According to one embodiment of the present invention, the time function table may be prepared into a type of a time function value corresponding to time difference information, or may be prepared so as to calculate a time function value corresponding to relevant time difference information by recording a time function having time difference information as a variable.

FIGS. 7 to 11 illustrate examples of standardized models of a time function which may be used to prepare the time function table in FIG. 6, or to be recorded therein.

Figure 7:
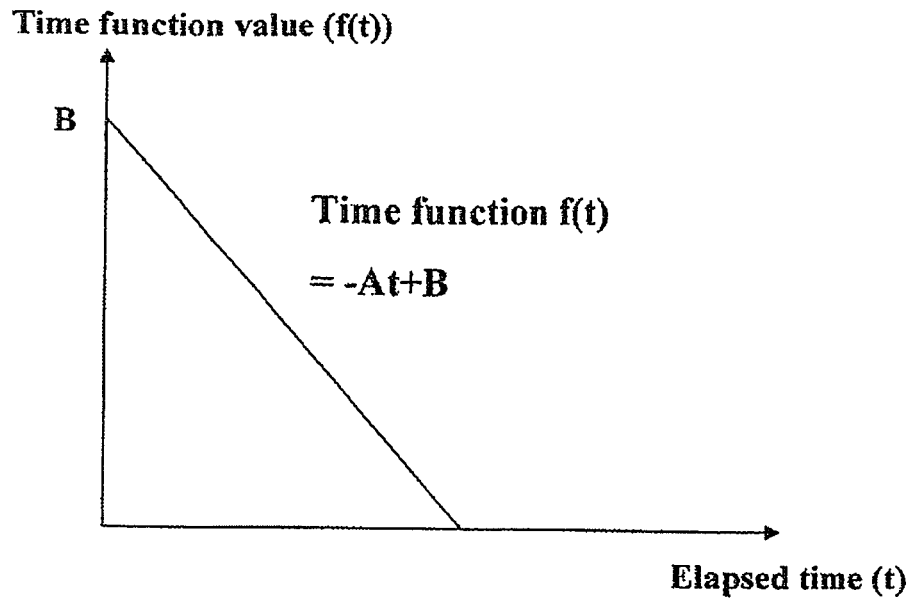
FIGS. 7-11 are drawings illustrating examples of a time function which may be used in a method providing a search result list in accordance with the first embodiment of the present invention.
Figure 11:
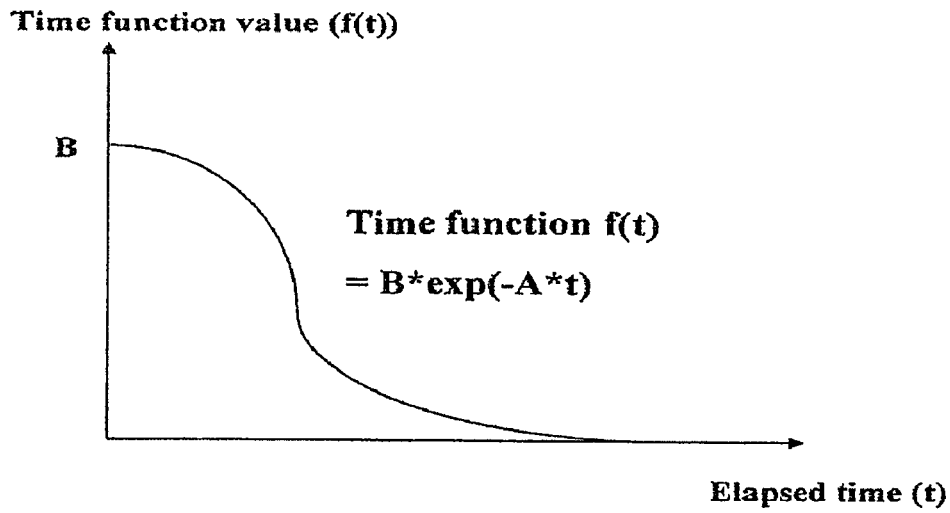

FIGS. 7 and 11 are drawings illustrating examples of a time function which may be used in a method providing a search result list in accordance with the first embodiment of the present invention.

FIG. 7 illustrates one example of a time function which may be employed to compute the time function value illustrated in FIG. 6. The time function illustrated in FIG. 7 is a linear function which has a predetermined intercept in case that time difference information (t) is 0, and wherein the time function value decreases gradually as the time difference information increases.

Figure 8:
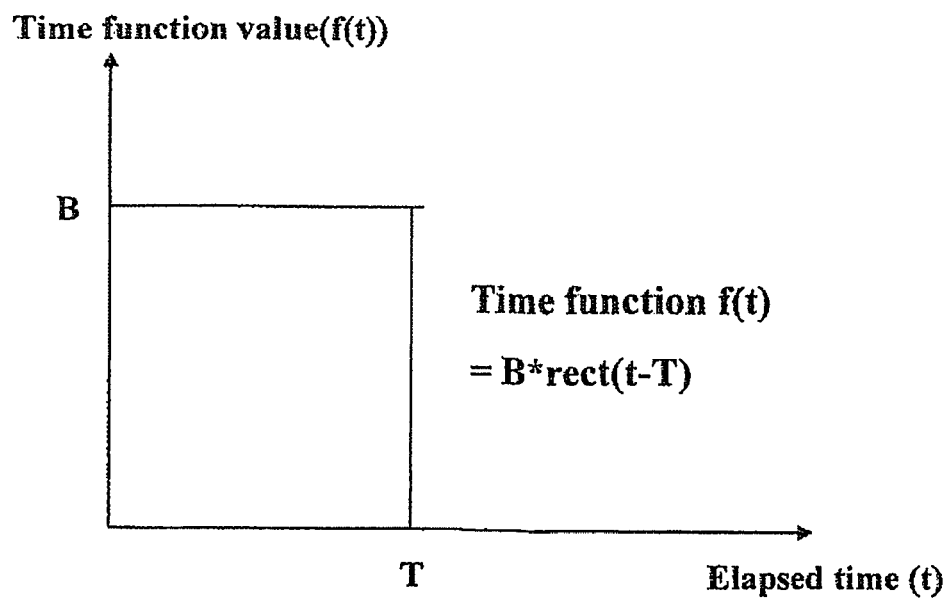

FIG. 8 illustrates one example of a time function which may be employed to compute the time function value illustrated in FIG. 6. The time function illustrated in FIG. 8 is a rectangular function and in case that time difference information (t) is 0, takes a predetermined intercept and holds the value of B with respect to predetermined time difference information. However, in case that time difference information exceeds T, the time function value is 0 or a certain value approximate to 0.

Figure 9:
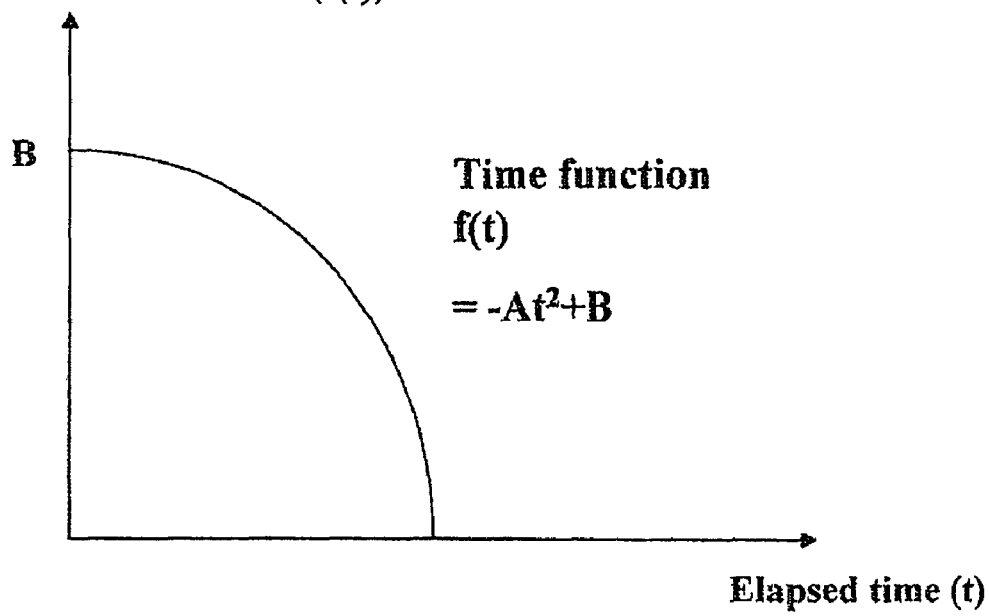

FIG. 9 illustrates one example of a time function which may be employed to compute the time function value illustrated in FIG. 6. The time function illustrated in FIG. 9 is a quadratic function and in case that time difference information (t) is 0, takes a predetermined intercept and the time function value decreases gradually as time difference information increases.

Figure 10:
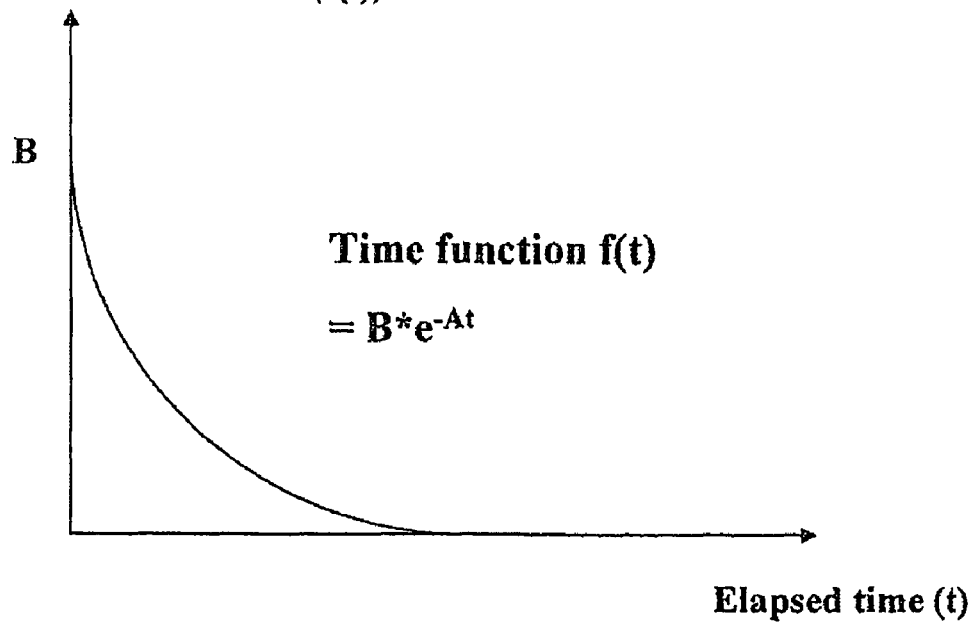

FIG. 10 illustrates one example of a time function which may be employed to compute the time function value illustrated in FIG. 6. The time function illustrated in FIG. 10 is an exponential function and in case that time difference information (t) is 0, takes a predetermined intercept and the time function value decreases gradually as time difference information increases.

FIG. 11 illustrates one example of a time function which may be employed to compute the time function value illustrated in FIG. 6. The time function illustrated in FIG. 11 is a Gaussian function and in case that time difference information (t) is 0, takes a predetermined intercept and the time function value decreases gradually as time difference information increases.

Like above, time functions illustrated in FIGS. 7 to 11 show that the time function value decreases gradually as time difference information increases and a variety of functions may be employed in accordance with implementation. In addition, examples of time functions illustrated in FIGS. 7 to 11 show that time function values converge into 0 as time difference information increase, however, it will be apparent to those skilled in the art that the examples like above may be exemplary and flexibly modified to have a value, not 0, in accordance with implementation.

Referring to FIG. 4 again, a predetermined keyword that a user wants to search for is received from a user terminal (step 403). A system for providing a search result list in accordance with the present invention receives the keyword and searches for at least one content including the keyword by referring to the content information database (step 404). The system for providing a search result list computes accuracy of the content with respect to the keyword, based on a predetermined accuracy computing algorithm with respect to at least one content including the keyword (step 405). The accuracy computing algorithm performed in the step 405, as aforementioned, may be implemented by a method of searching how many input keyword queries are included in the content; transforming frequency that the keyword appears in the content through the search like above, a location where the keyword appears within the content, structure of a relevant content document, and the like into numeric values; and normalizing data transformed into numeric values, thereby defining the normalized data as values between 0 and 1 (or between 0% and 100%). As for the accuracy computing algorithm like above, a well-known algorithm may be adopted and an accuracy computing algorithm modified for the purpose of the present invention may be adopted.

In the next, the system for providing a search result list searches for information on the registration date of the searched content by referring to the content information database (step 406). The system for providing a search result list computes time difference information by using information on the registration date searched in the step 406 and the time information received from the timer (step 407). A method of computing time difference information in the step 407 is to subtract information on the registration date from the time information, so as to determine how much time lapses from information on the registration date to the time information.

Referring to FIG. 5, the system computes a time function value corresponding to the computed time difference information by referring to the time function table, based on the computed time difference information (step 408). As aforementioned, the time function table may record a time function value corresponding to a predetermined time difference that is computed by using time functions illustrated in FIGS. 7 to 11 or a variety of time functions that may perform modeling for a concept of the time function according to the present invention. Moreover, the time function table may be embodied to calculate a time function value corresponding to the computed time difference information by recording the time function itself. In the step 408, particular time difference information (e.g., 3 hours 37 minutes, etc) may not be recorded in the time function table. At this time, a time function value may be determined in such a manner where approximate values (e.g., 3 hours and 4 hours) are abstracted from a field of time difference information of the time function table.

Importance information according to the present invention is computed by calculating the accuracy computed in the step 405 and the time function value computed in the step 408 (step 409). The calculation in the step 409 may be a procedure of multiplication, and may be embodied to determine whether accuracy of the content is put prior to time difference information or whether time difference information is put prior to accuracy of the content, by multiplying predetermined weight to accuracy or the time function value.

At least one content is sorted on the basis of the importance information computed in the step 409 (step 410) and search result list information is processed based on the sorted content (step 411). The step 411 may be performed in accordance with a search result list format that is used in each search engine. In association with how many search results should be included in one webpage, to what extent search results should be in detail, or the like, variety of modifications may be made to the step 411 in accordance with implementation. In processing search result list information like above, in case that the importance information computed in the step 409 is less than predetermined threshold, it may be possible to exclude the content from the search result list information.

The search result list information processed in the step 411 is transmitted to the user terminal through the wired/wireless communication network such as Internet, a mobile communication network or the like (step 412). The user can read the displayed search result list information through a browser of the user terminal.

The steps explained in FIGS. 4 and 5 are exemplary, and it will be apparent to those skilled in the art that flowcharts therein do not limit a method of time series implementation, in the method for providing a search result list in accordance with the present invention.

Figure 12:
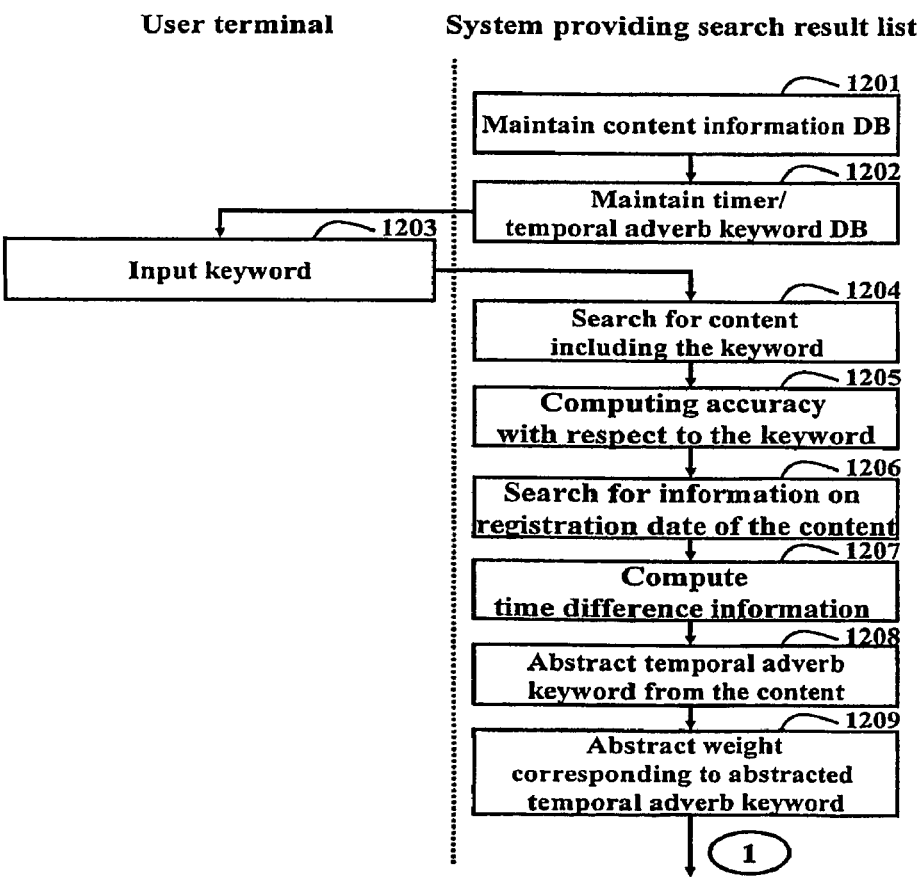
FIGS. 12 and 13 are flowcharts illustrating a method providing a search result list in accordance with a second embodiment of the present invention.
Figure 13:
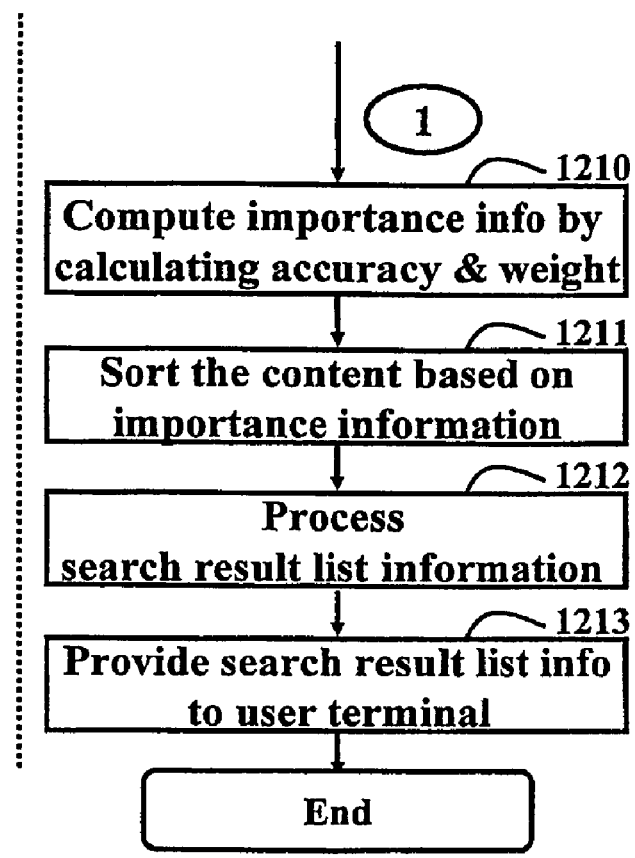

FIGS. 12 and 13 are flowcharts illustrating a method providing a search result list in accordance with a second embodiment of the present invention.

Referring to FIGS. 12 and 13, the method for providing a search result list in accordance with the second embodiment of the present invention may comprise the following steps.

A system for providing a search result list according to the present invention maintains a content information database storing at least one content and information on a registration date of the content (step 1201). Information on the registration date of the content may be time information that predetermined web page data, news article data, or knowledge search data are received from a predetermined content provider or the like, or a system of the present invention. Moreover, information on the registration date of the content may be time information that corresponding data are registered to the content information database.

Furthermore, the system for providing a search result list according to the present invention maintains a timer recording time information and a temporal adverb keyword database storing at least one predetermined temporal adverb keyword and predetermined weight corresponding thereto (step 1202). The temporal adverb keywords recorded in the temporal adverb keyword database may be all the adverbs expressing time included in the content, such as 'today', 'tomorrow', 'yesterday', 'these days', 'recently, 'lately', 'May 8, 2004', and the like. The temporal adverb keyword database according to the present invention records predetermined weight, in correspondence to the temporal adverb keywords. In addition, the time information recorded in the timer may be current time information as for one example. Any wanted time information may be received from a system operator or a search engine user, and recorded in the timer.

FIG. 14 is a drawing illustrating one example of a temporal adverb keyword database recording weight corresponding to time difference information by predetermined temporal adverb keyword, used in the second embodiment of the present invention.

Referring to FIG. 14, the temporal adverb keyword database according to one embodiment of the present invention records a predetermined temporal adverb keyword and weight corresponding to time difference information. At this time, the time difference information is predetermined in correspondence to the temporal adverb keyword. As for one example, in case that the temporal adverb keyword is 'today' and time difference information is 1, weight corresponding thereto may be 0.99. The weight like above may be designated differently in accordance with a kind of temporal adverb keyword, and may have a decreasing value as time difference information increases. The weight may be designated differently per temporal adverb keyword. However, this may mean that weight of the content decreases as information on the registration date of the content goes away from time information recorded in the timer.

Referring to FIG. 12 again, a predetermined keyword that the user wants to search for is received from the user terminal (step 1203). The system for providing a search result list according to the present invention receives the keyword and searches for at least one content including the keyword by referring to the content information database (step 1204). Accuracy of the content with respect to the keyword is computed on the basis of a predetermined accuracy computing algorithm with respect to at least one content including the keyword (step 1205). The accuracy computing algorithm in the step 1205 may be employed by the same method as aforementioned in FIG. 4.

In the next, information on the registration date of the searched content is searched by referring to the content information database (step 1206). Time difference information is computed by using information on the registration date searched in the step 1206 and the time information received from the timer (step 1207). A method of computing time difference information in the step 1207 is to subtract information on the registration date from the time information, so as to determine how much time lapses from information on the registration date to the time information.

The temporal adverb keyword stored in the temporal adverb keyword database is abstracted from at least one searched content (step 1208). With respect to the temporal adverb keyword abstracted from the content, weight corresponding to the temporal adverb keyword and the time difference information computed in the step 1207 is abstracted by referring to the temporal adverb keyword database (step 1209). In the step 1209, in case that the number of temporal adverb keywords included in the content or the kind thereof is at least one, the system may be embodied to compute the final weight of the content by calculating the abstracted weight in accordance with a predetermined algorithm. The algorithm like above may be appropriately revised and employed by an operator of the system for providing a search result list according to the present invention.

Referring to FIG. 13, importance information according to the present invention is computed by calculating the computed accuracy in the step 1205 and the abstracted weight in the step 1209 (step 1210). The calculation in the step 1209 may be a procedure of multiplication, and may be embodied to determine whether accuracy of the content is put prior to weight associated with the temporal adverb keyword or whether weight associated with the temporal adverb keyword is put prior to accuracy of the content, by multiplying predetermined second weight to accuracy or weight.

At least one content is sorted based on the importance information computed in the step 1210 (step 1211) and search result list information is processed based on the sorted content (step 1212). The step 1212 may be performed in accordance with a search result list format that is used in each search engine. In association with how many search results should be included in one webpage, to what extent search results should be in detail, or the like, variety of modifications may be made to the step 411 in accordance with implementation.

The search result list information processed in the step 1212 is transmitted to the user terminal through the wired/wireless communication network such as Internet, a mobile communication network or the like (step 1213). The user can read the displayed search result list information through a browser of the user terminal.

The steps explained in FIGS. 12 and 13 are exemplary, and it will be apparent to those skilled in the art that flowcharts therein do not limit a method of time series implementation, in a method for providing a search result list in accordance with the present invention.

Figure 15:
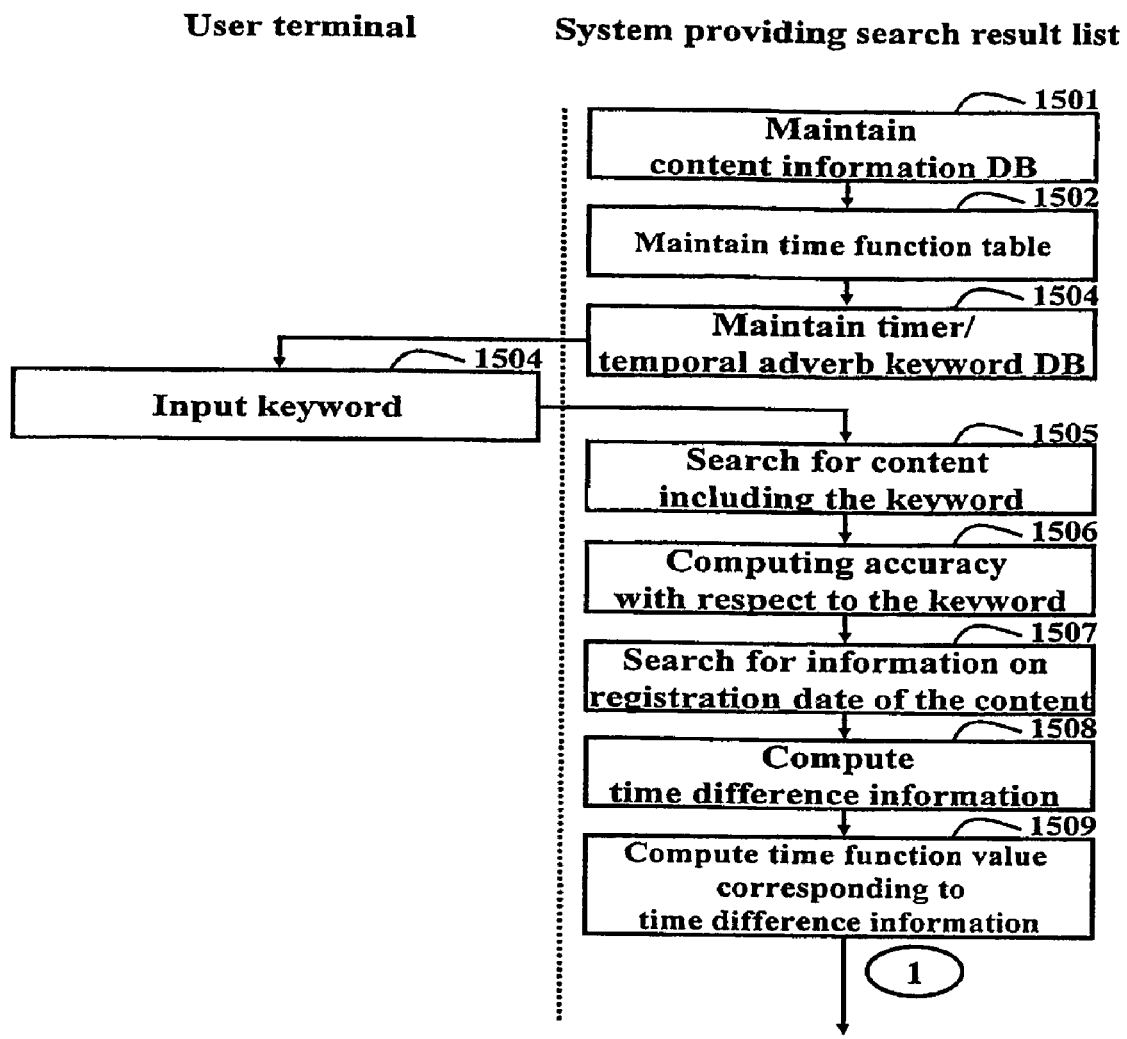
FIGS. 15 and 16 are flowcharts illustrating a method for providing a search result list in which the first embodiment and the second embodiment of the present invention are coupled.
Figure 16:
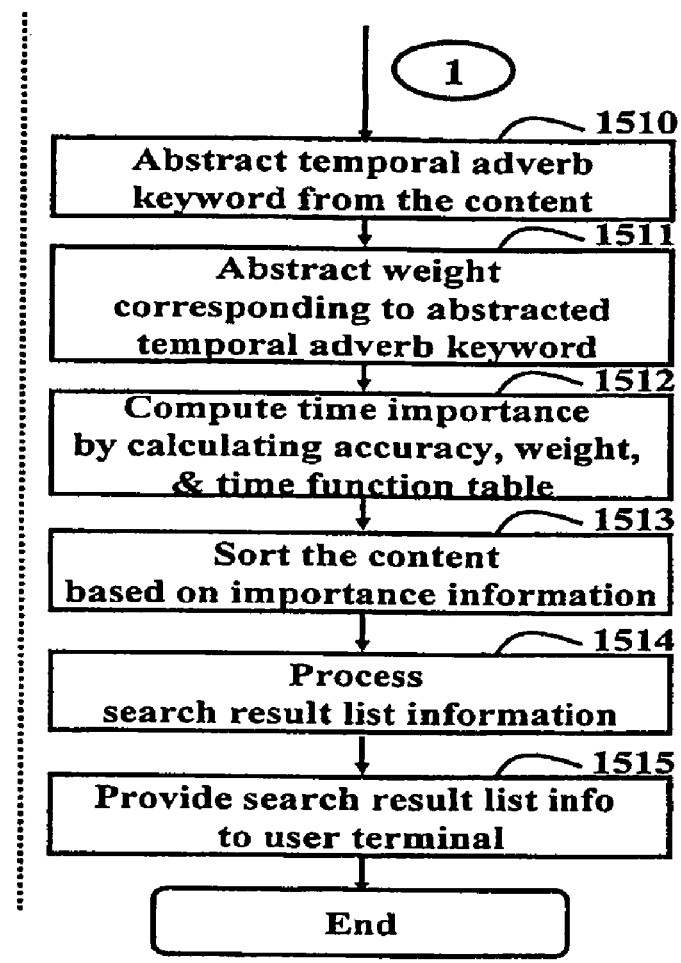

FIGS. 15 and 16 are flowcharts illustrating a method for providing a search result list in which the first embodiment and the second embodiment of the present invention are coupled.

The method illustrated in FIGS. 15 and 16 is a hybrid method between the first embodiment illustrated in FIGS. 4 and 5 and the second embodiment illustrated in FIGS. 12 and 13. More particularly, the method relates to a method considering all of (1) accuracy, (2) a time function value, and (3) weight, in computing importance information according to the present invention.

The steps 1501 to 1509 illustrated in FIG. 15 and the steps 1510 and 1511 illustrated in FIG. 16 are same to the aforementioned flows in FIGS. 4 and 5 and FIGS. 12 and 13. Thus, explanation with respect thereto will be same to that in FIGS. 4 and 5 and FIGS. 12 and 13. Hereinafter, the step 1512 will be in detail described. In the step 1512, importance information is computed on the basis of (1) accuracy, (2) a time function value, and (3) weight, obtained through the steps 1501 to 1511.

The step 1512, as aforementioned, is a step to compute importance information by considering all of (1) accuracy, (2) a time function value, and (3) weight, obtained through the steps 1501 to 1511. Accuracy, a time function value, and weight like above may be determined by an operator of the system according to the present invention, to configure a search result list with respect to the corresponding content based on which information among the above three is mainly computed through second weight information. For example, in case that the search result list is configured based on accuracy, importance information based on accuracy may be computed by determining second weight as 0.7, 0.2, and 0.1 with respect to accuracy: a time function value: weight respectively.

At least one content is sorted on the basis of the computed importance information in the step 1512 (step 1513) and search result list information is processed based on the sorted content (step 1514).

The search result list information processed in the step 1514 is transmitted to the user terminal through the wired/wireless communication network such as Internet, a mobile communication network or the like (step 1515). The user can read the displayed search result list information through a browser of the user terminal.

As aforementioned, the hybrid method for providing a search result list in accordance with the present invention, as illustrated in FIGS. 15 and 16, is exemplary, and it will be apparent to those skilled in the art that flowcharts therein do not limit a method of time series implementation, in a method for providing a search result list in accordance with the present invention.

FIG. 17 is a drawing illustrating one example of search result list information provided to a user terminal as a result that the method providing a search result list in accordance with the present invention is performed.

Referring to FIG. 17, 'show in order of importance' 1710 is included in a tap for sorting a search result list, which is different from FIGS. 1 and 2. In addition, the conventional methods, 'show in order of accuracy' and 'show in order of date' 1720 may be included in a page for a search result list, and for a user's conveniences, importance information 1730 of the content may be included with respect to the corresponding content of the search result list.

Figure 18:
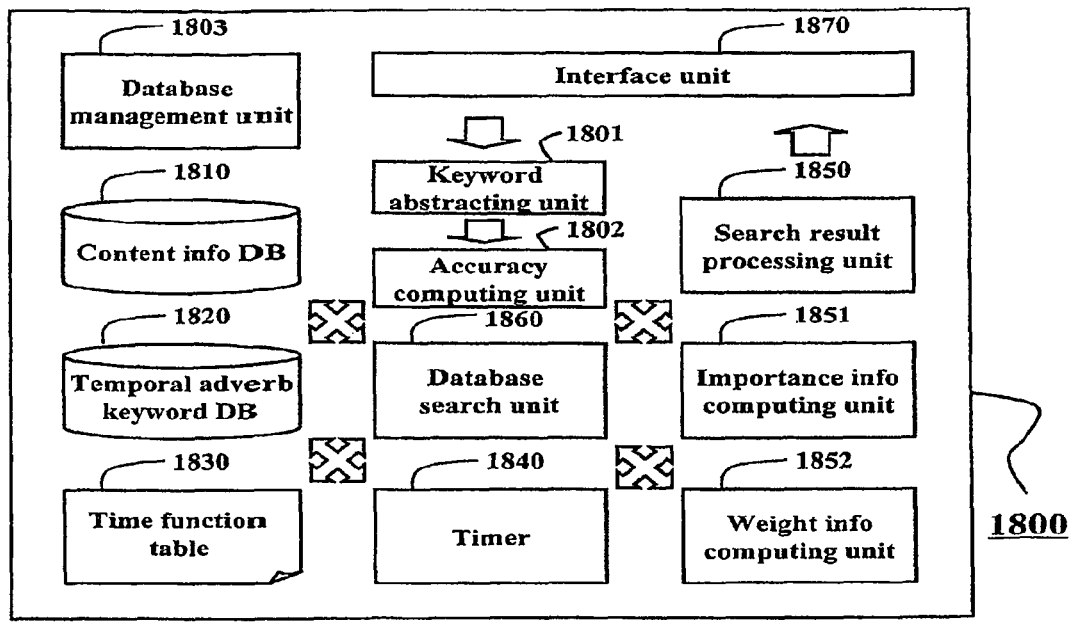
FIG. 18 is a block diagram illustrating one example of a system providing a search result list in which importance information according to the present invention is reflected.

FIG. 18 is a block diagram illustrating one example of a system providing a search result list in which importance information in accordance with the present invention is reflected.

A system for providing a search result list 1800 according to one preferred embodiment of the present invention comprises a content information database 1810, a temporal adverb keyword database 1820, a time function table 1830, a timer 1840, search result processing unit 1850, an importance information computing unit 1851, a weight information computing unit 1852, a database search unit 1860, an interface unit 1870, a keyword abstracting unit 1801, an accuracy computing unit 1802, and a database management unit 1803.

The content information database 1810 stores at least one content and information on a registration date of the content. The temporal adverb keyword database 1820 stores at least one predetermined temporal adverb keyword and predetermined weight corresponding thereto. The structure of the temporal adverb keyword database 1820 may be same as aforementioned in FIG. 14 and variety of modifications and applications may be made to the structure illustrated in FIG. 14.

The time function table 1830 is for storing a predetermined time function having predetermined time difference information as a variable. At this time, the time difference information may be difference between information on the registration date of the content and the time information recorded in the timer.

The timer 1840 maintains time information. According to one embodiment of the present invention, the time information may be current time information on the G.M.T (Greenwich Mean Time) base. Any wanted time information may be received from a system operator or a search engine user and recorded in the timer.

The search result processing unit 1850 functions to sort at least one content in accordance with the computed importance information, thereby to process the sorted content into search result list information.

The database search unit 1860 functions to search for at least one content including the keyword by referring to the content information database and searches for information on the registration date of the content.

The interface unit 1870 functions to receive a predetermined keyword query from a user's terminal (a personal computer or a personal portable terminal), search the content information database, and transmit search result list information corresponding to the received keyword query to the terminal.

The keyword abstracting unit 1801 functions to abstract a keyword from the content by using the received keyword from the interface unit 1870 or abstract a temporal adverb keyword from the content by using a temporal adverb keyword recorded in the temporal adverb keyword database 1820. Results of abstraction of keywords like above are transmitted to the accuracy computing unit 1802 and the weight information computing unit 1852.

The accuracy computing unit 1802 functions to compute accuracy of the searched content with respect to the keyword, based on a predetermined accuracy computing algorithm. The accuracy computing algorithm like above, as aforementioned, may be implemented by a method of searching how many input keyword queries are included in the content; transforming frequency that the keyword appears in the content through the search like above, a location where the keyword appears within the content, structure of a relevant content document, and the like into numeric values; and normalizing data transformed into numeric values, thereby defining the normalized data as values between 0 and 1 (or between 0% and 100%). As for the accuracy computing algorithm like above, a well-known algorithm may be adopted and an accuracy computing algorithm modified for the purpose of the present invention may be adopted.

The importance information computing unit 1851 functions to compute time difference information by using information on the searched registration date and the time information received from the timer, and compute a time function value corresponding to the computed time difference information by referring to the time function table. In addition, the importance information computing unit 1851 functions to compute importance information with respect to the searched content by calculating the computed accuracy and the computed time function value. Moreover, The importance information computing unit 1851 operates to compute importance information by calculating the weight computed in the weight information computing unit 1852 together with the aforementioned accuracy and the time function value.

In case that the temporal adverb keyword included in the content is abstracted from the keyword abstracting unit 1801, the weight information computing unit 1852 functions to abstract the weight with respect to the temporal adverb keyword by referring to the temporal adverb keyword database 1820. As aforementioned, the weight like above may be embodied to be adjustable by second weight information set by a system operator.

The database management unit 1803 includes a database management module for managing the aforementioned databases 1810 and 1820. The database management unit 1803 of the system 1800 may be embodied for the purpose of the present invention, by using Relational Database Management Systems (RDBMS) such as Oracle, Infomix, Sybase, DB2, and the like, or Object-Oriented Database Management Systems such as Gemston, Orion, O2, or the like.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts.

Figure 19:
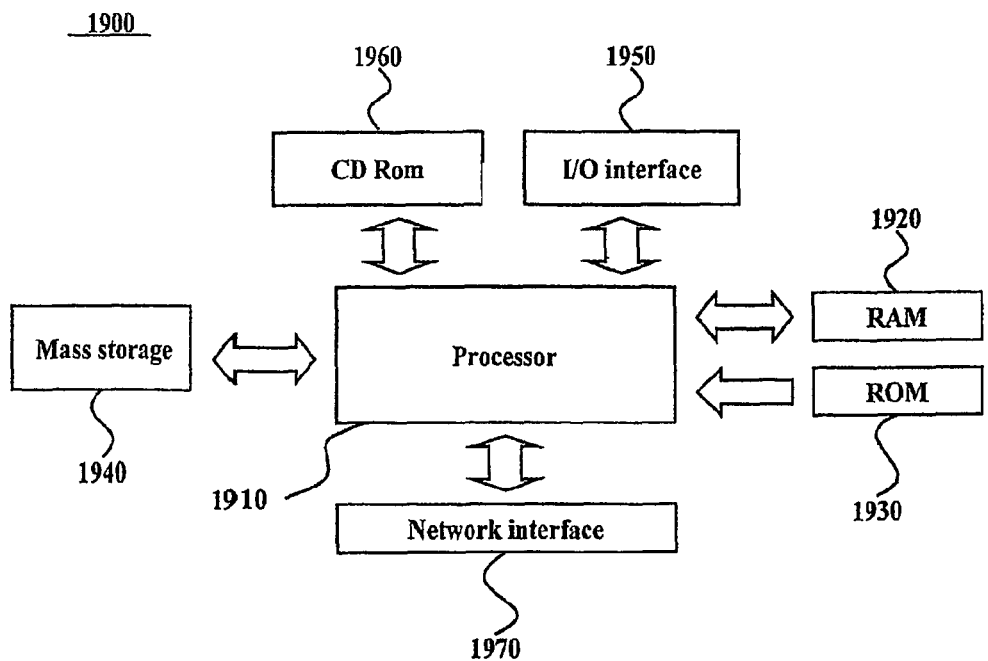
FIG. 19 is an internal block diagram of a general-purpose computer which may be adopted in method and system for providing a search result list in accordance with the present invention.

FIG. 19 is an internal block diagram of a general-purpose computer which may be adopted in method and system for providing a search result list in accordance with the present invention.

The computer system 1900 includes any number of processors 1910 (also referred to as central processing units, or CPUs) that are coupled to storage devices including primary storage (typically a random access memory, or "RAM 1920"), primary storage (typically a read only memory, or "ROM 1930"). As is well known in the art, ROM 1930 acts to transfer data and instructions uni-directionally to the CPU and RAM 1920 is used typically to transfer data and instructions in a bi-directional manner. Both of these primary storage devices may include any suitable type of the computer-readable media described above. A mass storage device 1940 is also coupled bi-directionally to CPU and provides additional data storage capacity and may include any of the computer-readable media described above. The mass storage device 1940 may be used to store programs, data and the like and is typically a secondary storage medium such as a hard disk that is slower than primary storage. A specific mass storage device such as a CD-ROM 1960 may also pass data uni-directionally to the CPU. Processor 1910 is also coupled to an interface 1950 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 1910 optionally may be coupled to a computer or telecommunications network using a network connection as shown generally at a network interface 1970. With such a network connection, it is contemplated that the CPU might receive information from the network, or might output information to the network in the course of performing the above-described method steps. The above-described devices and materials will be familiar to those of skill in the computer hardware and software arts.

The hardware elements above may be configured to act as one or more software modules for implementing the operations of this invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

INDUSTRIAL APPLICABILITY

According to the present invention, there is an effect that it is possible to provide method and system for providing a search result list, capable of providing a search result list on the basis of importance information in which accuracy and information on the registration date of a corresponding content are reflected.

Furthermore, according to method and system for providing a search result list in accordance with the present invention, there is an effect that, in case that opportuneness is required, it is possible to provide a user with a search result list having both opportuneness and accuracy, by using accuracy of a corresponding content and information on the registration date thereof.

Furthermore, according to method and system for providing a search result list in accordance with the present invention, there is an effect that it is possible to improve accuracy of a search result list in a user's position by providing the user with the search result list based on importance information.

Furthermore, according to method and system for providing a search result list in accordance with the present invention, there is an effect that it is possible to provide a user with a search result list in which the latest information is reflected by analyzing the temporal adverb and lowering order of importance of a content which is out of a predetermined period based on a present time.

Furthermore, according to method and system for providing a search result list in accordance with the present invention, there is an effect that it is possible to reduce communication costs spent in using the mobile search services by providing a search result list in which accuracy and the latest information with respect to a predetermined keyword query wanted by a user are reflected.

The invention claimed is:

1. A method for providing a user with a predetermined search result list by a search engine, comprising:

maintaining a content information database storing at least one content and registration date information for the content;

maintaining a timer, the timer maintaining time information and a time function table, the time function table storing a predetermined time function having time difference information as a variable, wherein the time difference information is difference between the registration date information for the content and the time information;

receiving at least one keyword from a user terminal with a search request;

searching for at least one content including the at least one keyword using the content information database;

computing accuracy of the searched content with respect to the at least one keyword, based on a predetermined accuracy computing criterion;

searching for the registration date information for the searched content using the content information database;

computing time difference information by using the searched registration date information and the time information received from the timer;

computing a time function value corresponding to the computed time difference information by using the time function table;

computing importance information of the searched content using the computed accuracy and the computed time function value;

sorting at least one content in accordance with the computed importance information, thereby processing the sorted content into search result list information;

maintaining a temporal adverb keyword database storing at least one predetermined temporal adverb keyword;

wherein computing importance information with respect to the searched content using the computed accuracy and the computed time function value comprises:

abstracting at least one temporal adverb keyword stored in the temporal adverb keyword database, from the searched content; and in case that the temporal adverb keyword is abstracted from the searched content, multiplying predetermined weight corresponding to the abstracted temporal adverb keyword to the computed importance information.

2. The method of claim 1, wherein the time function table records the time function value corresponding to the time difference information.

3. The method of claim 1, wherein the time function value is computed using at least one of a linear function, an exponential function, a quadratic function, a rectangular function, and a Gaussian Distribution function.

4. The method of claim 1, wherein the weight is a value between 0 and 1.

5. The method of claim 1, wherein the predetermined accuracy computing criterion in the step of computing the accuracy includes at least one selected from a group consisting of the number of the keywords included in the content, a location of the keyword, whether the content is a hyperlink included the content, and frequency of the keyword included in a second content connected by the hyperlink.

6. The method of claim 1, wherein the content is news article data or knowledge search data.

7. The method of claim 1, wherein the step of sorting at least one content in accordance with the computed importance information, thereby processing the sorted content into search result list information, comprises:

determining whether the computed importance information is less than predetermined threshold; and in case that it is determined that the importance information is less than the threshold, deleting the content from the search result list information.

8. The method of claim 1, wherein the time information is current time information.

9. The method of claim 1, wherein the terminal of the user is a personal computer or a personal portable terminal.

10. A method for providing a user with a predetermined search result list by search engine, the method comprising:

maintaining a content information database storing at least one content and registration date information for the content;

maintaining a temporal adverb keyword database storing at least one predetermined temporal adverb keyword and predetermined weight corresponding thereto;

maintaining a timer, the timer maintaining time information;

receiving at least one keyword from a user terminal with a search request;

searching for at least one content including the keyword by referring to the content information database;

computing accuracy of the searched content with respect to the keyword, based on a predetermined accuracy computing criterion;

searching for the registration date information for the searched content by referring to the content information database;

computing time difference information by using the searched registration date information and the time information received from the timer;

abstracting at least one temporal adverb keyword stored in the temporal adverb keyword database, from the searched content; and in case that the temporal adverb keyword is abstracted from the searched content, abstracting the weight corresponding to the abstracted temporal adverb keyword and the computed time difference information, by referring to the temporal adverb keyword database;

computing importance information by calculating the computed accuracy and the abstracted weight; and sorting at least one content in accordance with the computed importance information, thereby processing the sorted content into search result list information.

11. The method of claim 10, wherein the weight is a value between 0 and 1.

12. The method of claim 10, wherein the predetermined accuracy computing criterion in the step of computing the accuracy includes at least one selected from a group consisting of the number of the keywords included in the content, a location of the keyword, whether the content is a hyperlink included the content, and frequency of the keyword included in a second content connected by the hyperlink.

13. The method of claim 10, wherein the content is news article data or knowledge search data.

14. The method of claim 10, wherein the step of sorting at least one content in accordance with the computed importance information, thereby processing the sorted content into search result list information comprises:

determining whether the computed importance information is less than predetermined threshold; and in case that it is determined that the importance information is less than the threshold, deleting the content from the search result list information.

15. The method of claim 10, wherein the time information is current time information.

16. The method of claim 10, wherein the terminal of the user is a personal computer or a personal portable terminal.

17. A non-transitory computer-readable medium comprising an executable program which, when executed, performs the steps of:

maintaining a content information database storing at least one content and registration date information for the content;

maintaining a timer, the timer maintaining time information and a time function table, the time function table storing a predetermined time function having time difference information as a variable, wherein the time difference information is difference between the registration date information for the content and the time information;

receiving at least one keyword from a user terminal with a search request;

searching for at least one content including the at least one keyword using the content information database;

computing accuracy of the searched content with respect to the at least one keyword, based on a predetermined accuracy computing criterion;

searching for the registration date information for the searched content using the content information database;

computing time difference information by using the searched registration date information and the time information received from the timer;

computing a time function value corresponding to the computed time difference information by using the time function table;

computing importance information of the searched content using the computed accuracy and the computed time function value;

sorting at least one content in accordance with the computed importance information, thereby processing the sorted content into search result list information;

maintaining a temporal adverb keyword database storing at least one predetermined temporal adverb keyword;

wherein computing importance information with respect to the searched content using the computed accuracy and the computed time function value comprises:

abstracting at least one temporal adverb keyword stored in the temporal adverb keyword database, from the searched content; and in case that the temporal adverb keyword is abstracted from the searched content, multiplying predetermined weight corresponding to the abstracted temporal adverb keyword to the computed importance information.

18. A system for providing a user with a predetermined search result list, comprising:

a content information database storing at least one content and registration date information for the content;

a timer maintaining time information;

a time function table storing a predetermined time function having time difference information as a variable, wherein the time difference information is difference between the registration date information for the content and the time information;

an interface unit, the interface unit receiving at least one keyword from a user terminal and in response thereto, the interface unit transmitting search result list information to the terminal;

a database search unit, the database search unit searching for at least one content including the keyword and the registration date information for the content, by referring to the content information database;

an accuracy computing unit computing accuracy of the searched content with respect to the keyword, based on a predetermined accuracy computing criterion;

an importance information computing unit, the importance information computing unit computing time difference information by using the searched registration date information and the time information received from the timer, the importance information computing unit computing a time function value corresponding to the computed time difference information by referring to the time function table, and the importance information computing unit computing importance information of the searched content by calculating the computed accuracy and the computed time function value;

a search result processing unit sorting at least one content in accordance with the computed importance information, thereby processing the sorted content into search result list information;

a temporal adverb keyword database storing at least one predetermined temporal adverb keyword and predetermined weight corresponding thereto;

a keyword abstracting unit abstracting the temporal adverb keyword stored in the temporal adverb keyword database, from the searched content; and a weight information computing unit, the weight information computing unit abstracting the weight with respect to the temporal adverb keyword by referring to the temporal adverb keyword database if the temporal adverb keyword included in the content is abstracted from the keyword abstracting unit; and wherein the importance information computing unit computes the importance information by calculating the weight abstracted from the weight information computing unit with the accuracy and the time function value.

19. A non-transitory computer-readable medium comprising an executable program which, when executed, performs the steps of:

maintaining a content information database storing at least one content and registration date information for the content;

maintaining a temporal adverb keyword database storing at least one predetermined temporal adverb keyword and predetermined weight corresponding thereto;

maintaining a timer, the timer maintaining time information;

receiving at least one keyword from a user terminal with a search request;

searching for at least one content including the keyword by referring to the content information database;

computing accuracy of the searched content with respect to the keyword, based on a predetermined accuracy computing criterion;

searching for the registration date information for the searched content by referring to the content information database;

computing time difference information by using the searched registration date information and the time information received from the timer;

abstracting at least one temporal adverb keyword stored in the temporal adverb keyword database, from the searched content; and in case that the temporal adverb keyword is abstracted from the searched content, abstracting the weight corresponding to the abstracted temporal adverb keyword and the computed time difference information, by referring to the temporal adverb keyword database;

computing importance information by calculating the computed accuracy and the abstracted weight; and sorting at least one content in accordance with the computed importance information, thereby processing the sorted content into search result list information.

* * * * *